(12) United States Patent
Lee et al.

(10) Patent No.: US 7,272,638 B2
(45) Date of Patent: Sep. 18, 2007

(54) LOCAL AREA INFORMATION PROVIDING SYSTEM AND METHOD USING REAL NAME

(75) Inventors: Pan-Jung Lee, Seoul (KR); Jeen-Hyun Bae, Kyungsangbuk-do (KR)

(73) Assignee: Netpia Dot Com Inc., Seoul (KR)

( * ) Notice: Subject to any disclaimer, the term of this patent is extended or adjusted under 35 U.S.C. 154(b) by 661 days.

(21) Appl. No.: 09/784,682

(22) Filed: Feb. 14, 2001

(65) Prior Publication Data

US 2001/0052002 A1   Dec. 13, 2001

(30) Foreign Application Priority Data

May 30, 2000  (KR) .............................. 2000-29409
Jul. 20, 2000  (KR) .............................. 2000-41703

(51) Int. Cl.
*G06F 15/16* (2006.01)

(52) U.S. Cl. ................... 709/217; 709/203; 709/223; 709/224; 709/248; 707/3; 707/4; 707/6; 707/10

(58) Field of Classification Search ............... 709/203, 709/217–219, 224, 248; 707/10, 3–7
See application file for complete search history.

(56) References Cited

U.S. PATENT DOCUMENTS 4,737,977 A * 4/1988 Norman ...................... 455/403
5,920,854 A * 7/1999 Kirsch et al. ................. 707/3
5,987,446 A * 11/1999 Corey et al. .................. 707/3
6,009,459 A * 12/1999 Belfiore et al. ............. 709/203
6,014,090 A * 1/2000 Rosen et al. ................ 340/905

(Continued)

FOREIGN PATENT DOCUMENTS

JP   P2000-20433 A   1/2000

(Continued)

OTHER PUBLICATIONS

"Netscape Communicator 4.5," Author unknown, source unknown, Sep. 7, 1998, pp. 202-206.

(Continued)

*Primary Examiner*—Saleh Najjar
*Assistant Examiner*—Shawki Ismail
(74) *Attorney, Agent, or Firm*—Brinks Hofer Gilson & Lione (57) ABSTRACT

Disclosed is a local area information-providing system and method using real names. When an access word provided by an accessing client via a network is a real name, a local area information database is searched using the real name and the client's position information, and various kinds of information on the real name placed within an area corresponding to the client's position information are found and provided to the client. Together with this, an Internet address corresponding to the real name is provided to the client, and accordingly, the client accesses the web page corresponding to the input real name. Hence, the user can access desired web pages using not conventional English domain names but real names, and concurrently receive various kinds of local area information corresponding to the real name. Especially, the user can receive various kinds of local area information of the real names corresponding to predetermined positions without additional position assignment.

19 Claims, 4 Drawing Sheets

U.S. PATENT DOCUMENTS

| | | | | |
|---|---|---|---|---|
| 6,070,162 | A * | 5/2000 | Miyasaka et al. | 707/4 |
| 6,094,649 | A * | 7/2000 | Bowen et al. | 707/3 |
| 6,148,289 | A * | 11/2000 | Virdy | 705/1 |
| 6,233,578 | B1 * | 5/2001 | Machihara et al. | 707/10 |
| 6,377,961 | B1 * | 4/2002 | Ryu | 707/7 |
| 6,408,270 | B1 * | 6/2002 | Garber | 704/251 |
| 6,529,903 | B2 * | 3/2003 | Smith et al. | 707/7 |
| 6,601,061 | B1 * | 7/2003 | Holt et al. | 707/3 |
| 6,608,634 | B1 * | 8/2003 | Sherrard et al. | 345/730 |
| 6,615,237 | B1 * | 9/2003 | Kyne et al. | 709/203 |
| 6,618,726 | B1 * | 9/2003 | Colbath et al. | 707/6 |
| 6,629,092 | B1 * | 9/2003 | Berke | 707/3 |
| 6,684,218 | B1 * | 1/2004 | Santos et al. | 707/102 |
| 6,701,310 | B1 * | 3/2004 | Sugiura et al. | 707/5 |
| 6,741,188 | B1 * | 5/2004 | Miller et al. | 340/995.1 |
| 6,757,740 | B1 * | 6/2004 | Parekh et al. | 709/245 |
| 6,876,997 | B1 * | 4/2005 | Rorex et al. | 707/3 |
| 6,883,001 | B2 * | 4/2005 | Abe | 707/10 |
| 6,925,456 | B2 * | 8/2005 | Nakano et al. | 707/1 |
| 6,996,520 | B2 * | 2/2006 | Levin | 704/10 |
| 7,020,602 | B1 * | 3/2006 | Kim et al. | 704/8 |
| 7,039,625 | B2 * | 5/2006 | Kim et al. | 707/1 |
| 7,058,626 | B1 * | 6/2006 | Pan et al. | 707/4 |
| 7,194,524 | B2 * | 3/2007 | Suzuki et al. | 709/219 |
| 2001/0037377 | A1 * | 11/2001 | Nakano et al. | 709/219 |
| 2002/0152258 | A1 * | 10/2002 | Zhou | 709/201 |
| 2005/0192957 | A1 * | 9/2005 | Newbold | 707/5 |

FOREIGN PATENT DOCUMENTS

| | | | |
|---|---|---|---|
| JP | P2000-134252 A | 5/2000 | |
| KR | 1019990068686 A | 6/1999 | |
| KR | 1020000006171 A | 1/2000 | |
| WO | WO99/39280 A2 | 8/1999 | |
| WO | WO99/40517 A1 | 8/1999 | |

OTHER PUBLICATIONS

"Topics" article, author unknown, PC Work!, vol. 3, No. 9, Sep. 18, 1998, pp. 177-179.

"Cyberwork URL transformation system V1.02," author unknown, Impress Corporation, Mar. 17, 1999, one page.

"Features 5" article, author unknown, Mac Fan Special/Mac OS 9, Nov. 22, 1999, pp. 99-107.

"Report" article, author unknown, Nikkei Communications, vol. 309, Jan. 3, 2000, pp. 48-49.

"Focus" article, author unknown, Nikkei NetBusiness, Jun. 2000, pp. 30-31.

"Tips" article, author unknown, Just Moai, vol. 132, Jun. 2000, pp. 40-41.

Abstract of Japanese published application No. 2000-134252, Patent Abstracts of Japan, available at web site http://www19.ipdl.ncipi.go.ip/PA1/result/detail/main/wAAAS6aygHDA41202 . . . as of Aug. 26, 2005, one sheet.

Abstract of Japanese published application No. 2000-020433, Patent Abstracts of Japan, available at web site http://www19.ipdl.ncipi.go.ip/PA1/result/detail/main/wAAAUsa4PhDA41213 . . . as of Aug. 26, 2005, one sheet.

Korean Patent Abstracts of South Korean published application No. 1020000006171, Korean Intellectual Property Office, available at web site http://kpa.kipris.or.kr/newps/kpa_image/1999A1019990022166/kpa.xml as of Aug. 26, 2005, one sheet.

* cited by examiner

LOCAL AREA INFORMATION PROVIDING SYSTEM AND METHOD USING REAL NAME

This application claims priority under the Republic of Korea patent applications No. 2000-29409 filed on May 30, 2000 and 2000-41703 filed on Jul. 20, 2000.

BACKGROUND OF THE INVENTION (a) Field of the Invention

The present invention relates to a local area information providing system and method using real names. More specifically, the present invention relates to a system and method for accessing users to predetermined network web pages using real names and concurrently providing local area information corresponding to the real names according to user's position information.

(b) Description of the Related Art

As network technologies have greatly developed, global people have come to share various kinds of information via the Internet.

The Internet is not simply a gathering of a plurality of computers, but rather it is a huge connection network of different computers, and computers connected to the Internet are respectively assigned an Internet protocol (IP) number for identification.

However, since the address includes four groups of numbers equal or below 255 (e.g., 134.78.238.99), it is difficult for a user to remember these number sequences, and it is inconvenient for the user to individually input the IP address each time the user desires to access a predetermined computer connected to the Internet.

Hence, the IP address is matched with a combination of letters for easily remembering the IP address one by one instead of directly accessing the computer by using the address, and when the user inputs a letter sequence, the user is automatically accessed to the computer having the corresponding IP address. The combination of the letter sequence is referred to as a domain name.

The domain name represents an Internet address of the computer connected to the Internet, and generally comprises an identifier for displaying corresponding computer characteristics or local area positions. In order to use the domain name instead of the computer's IP address, an additional device for matching the computer IP address with the domain name is required, and the respective computers connected to the Internet are related to a domain name server (DNS) according to the above-noted requirement.

Generally, when a client requests a confirmation of the domain name of the corresponding computer, for example, a confirmation of the IP address of "def.co.kr" to the DNS in order to access a predetermined computer on the Internet, the DNS requests an IP address corresponding to the input domain name to a registration agency server that controls the IP addresses, and returns the IP address provided by the registration agency to the client, and accordingly, the client accesses the computer having the corresponding IP address.

As described above, the user should know the corresponding domain name so as to access the predetermined computer on the Internet. However, since general domain names comprise a combination of English letters having a predetermined rule, it is relatively difficult for non-English speaking people such as Koreans, Japanese or Chinese to remember the domain names.

Also, when a directory or a file name storing information is required to access a predetermined web page, the directory and the file name for accessing the web page can be modified according to a computer manager, and the directory and the file name comprise a combination of English letters, like the domain names.

Therefore, it is difficult to memorize the domain names and the file names for accessing the web pages, and it takes much time to input the domain names and the file names.

When a user desires to search predetermined information on the Internet, the user inputs a domain name of a site that provides an information searching service via a browser to access the corresponding site, and inputs a search word of desired information. Further, when the user desires to selectively search information stored at a predetermined position, the user must establish the position, which creates complicated steps for finding desired information.

SUMMARY OF THE INVENTION

It is an object of the present invention to easily access a web page by using a real name for calling the desired web page without inputting a uniform resource locator (URL) such as domain names of the web pages on the network, and to concurrently provide local area information corresponding to the real name according to the user's position information in order for the user to quickly receive various kinds of information. Here, the web pages represent servers for providing world wide web (WWW), electronic mail, file transfer protocol (FTP) and telnet on the network.

In one aspect of the present invention, a local area information providing system comprises a local area information database for storing local area information with respect to areas corresponding to real names; and a web server for determining whether an access word is a real name when the access word is provided by a client, and searching the local area information database and providing local area information of the real name positioned within an area corresponding to position information of the client to the client when the access word is found to be a real name.

The system further comprises: a first real name database for storing network addresses on the network, real names and position information; and a real name server for searching the first real name database using the real name and the client's position information, finding a corresponding network address and providing the network address to the client when the access word input by the client is a real name.

The system further comprises a second real name database for storing network addresses corresponding to second real names including firm names, product names and service names, and the real name server searches the first real name database and provides the real name and the network address corresponding to the client's position information to the client when the real name is the first real name, and searches the second real name database and provides the network address corresponding to the second real name to the client when the real name is the second real name.

In another aspect of the present invention, in a method for providing local area information using a real name to a client that accesses via a network, a local area information providing method comprises the steps of: (a) determining whether an access word provided by a client that accesses via the network is a real name; (b) setting position information of the client when the access word is a real name; and (c) finding local area information corresponding to the real name located within an area corresponding to the client's position information and providing the same to the client.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiments of the invention have been shown and described, simply by way of illustration of the best modes contemplated by the inventor(s) of carrying out the invention. As will be realized, the invention is capable of modification in various obvious respects, all without departing from the invention. Accordingly, the drawings and description are to be regarded as illustrative in nature, and not restrictive.

In the local area information providing system using real names according to preferred embodiments of the present invention, the real names which comprise Korean, foreign languages except English, numbers or symbols corresponding to the registered Internet addresses are separately established to enable accessing the web pages using the real names. The real name can be a one word English word.

Hereinafter, for ease of description, the URLs of the conventional domain names or file names will be referred to as "English domain name", character sequences input by the client so as to access a predetermined web page will be referred to as "an access word", and IP addresses and URLs of predetermined web pages will be referred to as Internet addresses. The access word, that is, a domain name comprises "English domain names" and "real names." The real names represent company names, firm names or service titles, etc.

The real name in the preferred embodiment comprises a first real name which is a keyword of life information including local area characteristics and a second real name which does not include the local area characteristics. The first real name represents a plurality of objects that have similar characteristics according to local areas, such as municipality offices, pizzerias, theaters and hospitals. The second real name represents other real names excluding the first real names, and especially includes firm names, product names and service names. The local area information is information on the first real name classified by the local areas. For example, information on a municipality office positioned at the predetermined area Yoksam-dong with respect to the first real name "municipality office" can be the local area information, and information on the theater corresponding to the predetermined area Kangnam-ku with respect to the first real name "theater" can be local area information.

Figure 1:
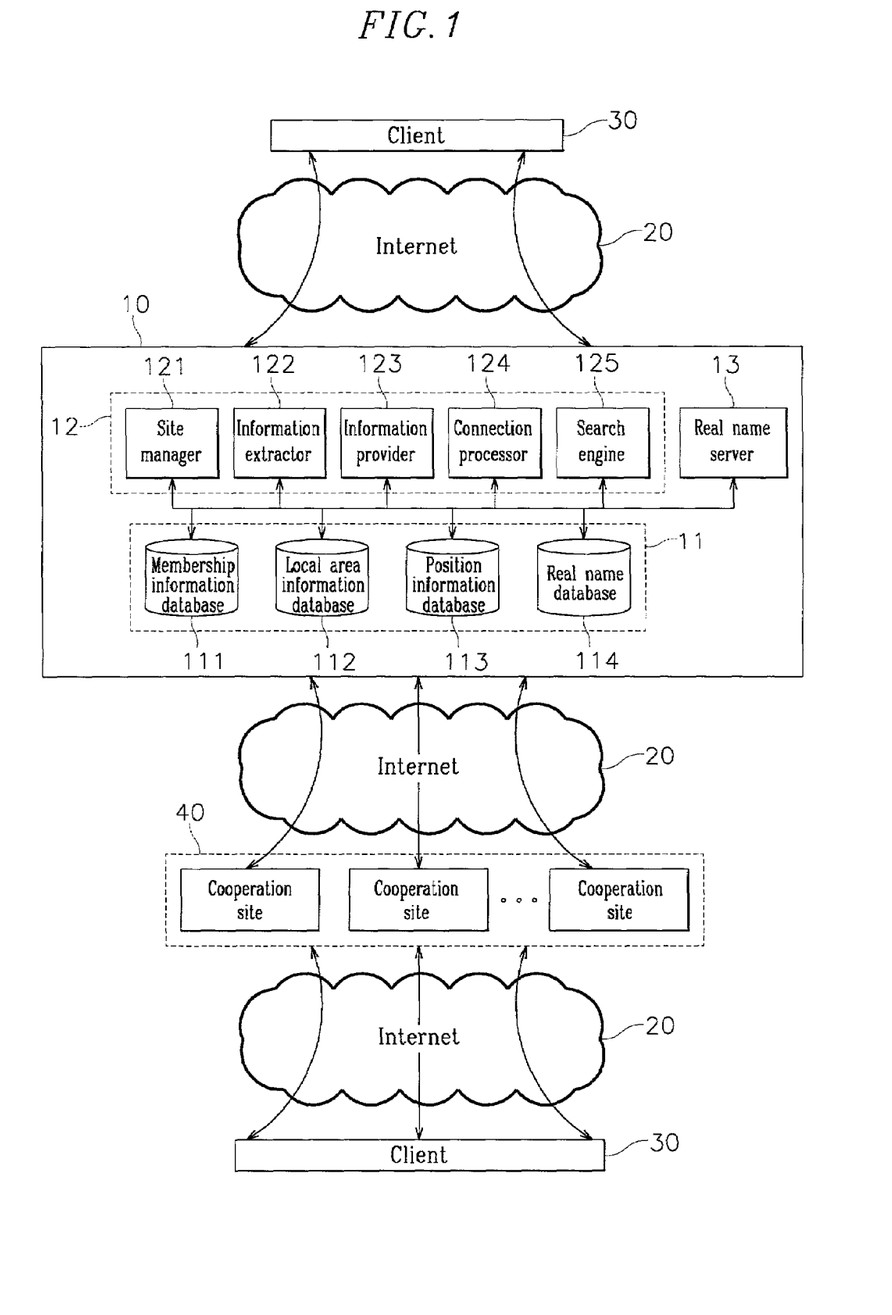
FIG. 1 shows a block diagram of a local area information providing system using a real name according to a first preferred embodiment of the present invention.

FIG. 1 shows a block diagram of a local area information providing system using the real name according to a first preferred embodiment of the present invention.

As shown, the local area information providing system 10 using the real name according to the first preferred embodiment of the present invention is connected to a plurality of clients 30 and a cooperation apparatus 40 via the Internet 20 (including a future network).

The local area information providing system 10 enables the client 30 that accesses via the Internet 20 or the client 30 that accesses via the cooperation apparatus 40 to access a predetermined web page corresponding to the real name and concurrently provides local area information corresponding to the real name by using the position information of the client 30.

For this, the local area information providing system 10 comprises a database server 11 for storing information needed for the local area information providing service according to information on the client's position, a web server 12 for providing real name local area information services and web page accessing services according to position information to the clients 30 that access using the information stored in the database server 11 or access via the cooperation apparatus 40, and a real name server 13.

As shown in FIG. 1, the database server 11 comprises a membership information database 111, a local area information database 112, a position information database 113 and a real name database 114.

The membership information database 111 stores information on registered users who can get local area information providing service, for example, user names, identification numbers (ID) for the login process, passwords, addresses, cell phone numbers, electronic mail addresses, telephone numbers, and resident registration numbers according to membership classification codes assigned to the users. Here, the user's address can be used as the user's position information.

The local area information database 112 stores information corresponding to the first real name, for example, information (position and introduction) on the municipality offices located in the corresponding areas corresponding to the first real name "municipality office" and information on pizza delivery shops in the individual areas corresponding to the first real name "pizza."

The position information database 113 stores information on positions of the IP addresses registered to the IP address registration agency, for example, position information (e.g., address) on the user who registered a specific IP address "211.140.345.55" corresponding to the IP address. Here, the administrative position information can be obtained from the IP address assigned to the client 30 that accesses via an exclusive line, communication company, or an Internet service provider (ISP) on the Internet, and the administrative position information is used as the user's position information.

The real name database 114 stores at least one real name (including the first and second real names) corresponding to all IP addresses on the Internet 20, and URL information corresponding to the real names. For example, the real name "Netpia" is stored corresponding to the IP address "210.103.175.66", and the URL information "netpia.net" is stored corresponding to "Netpia."

Especially in the preferred embodiment of the present invention, the IP addresses or UPL information is stored corresponding to the first real name and the user's position information so as to automatically access the web page corresponding to the first real name including the local area characteristics according to the user's position information. For example, an IP address "120.130.280.33" can be stored corresponding to "theater (first real name). Kangnam-ku Yoksam-dong (user's position information)." Accordingly, "user's position information+first real name" functions as a domain name.

The real name database 114 stores IP addresses or URL information corresponding to the second real name. In the preferred embodiment of the present invention, the real name database 114 stores the IP addresses or URL information on the first and second real names, but the real name database can be divided into individual databases for respectively storing the IP addresses and URL information on the first and second real names.

The web server 12 provides local area information corresponding to the first real name to the client 30 according to information stored in the databases 111 through 114, and performs a web function for the client 30 or the cooperation apparatus 40 to access via the Internet 20. The web server 12 comprises a site manager 121, an information extractor 122, an information provider 123, a connection processor 124 and a search engine 125.

The site manager 121 provides homepages having various menus such as site introductions and member registration to the client 30 or the cooperation apparatus 40 accessed via the Internet 20 in order for the user to register himself as a member for receiving local area information service using the real name or to register himself to the cooperation agency.

The information extractor 122 extracts an IP address from the client 30 that accesses via the Internet 20, and searches the position information database 113 based on the extracted IP address to extract the user's position information.

When the access word provided by the client 30 or the cooperation apparatus 40 is the first real name, the information provider 123 searches the local area information database 112 according to the user's position information provided by the information extractor 122, finds the local area information corresponding to the first real name and provides the same to the client 30.

When at least one real name corresponds to the IP address corresponding to the input access word, that is, when the corresponding IP address is not the real IP, the connection processor 124 connects the client 30 to the corresponding web page according to the URL information corresponding to the access word.

When the access word is not stored in the real name database 114, the search engine 125 searches data of a plurality of servers on the Internet 20 and collects information on the web pages that provide information including the access word.

Here, the individual components 121 through 124 are illustrated to operate in the web server 12, but the components can be implemented as independent servers to process corresponding functions.

The real name server 13 determines whether the access word provided by the client 30 or the cooperation apparatus 40 is a real name, and when the access word is found to be a real name, the real name server 13 provides the corresponding IP address to the client 30 or the cooperation apparatus 40 using the data stored in the real name database 114.

Especially, when the access word is a first real name, the real name server 13 searches the real name database 114 together with the user's position information, searches the IP address stored corresponding to the input first real name and the user's position information and provides the IP address to the client 30 so that the client 30 is automatically connected to the web page that provides information on the first real name positioned at the user's desired local area.

A communication device for accessing the local area information providing system 10 or the cooperation apparatus 40 via the Internet 20 is used as the client 30. For example, a computer, mobile communication terminal, or Internet TV can be used. The client 30 provides the access word corresponding to the web page to the local area information providing system 10 or the cooperation apparatus 40.

The cooperation apparatus 40 cooperates with the local area information providing system 10 having the above-noted configuration, and provides web page access services or local area information providing services to the client 30 using the real names without building an additional real name database or local area information database.

Therefore, the client 30 directly accesses the local area information providing system 10 and receives the web page access services and local area information providing services using the real names, and further when accessing the cooperation apparatus 40, the client 30 can receive the above-noted services according to the preferred embodiment of the present invention.

An operation of the local area information providing system using the real name according to the first preferred embodiment of the present invention will now be described.

Here, before running a browser for accessing the Internet, the client 30 executes an Internet access environment setting program and sets the real name server 13 as a server for providing an IP address confirmation service. In this case, it is preferable that the IP address values of an English domain name server (not illustrated) are previously stored as backup data, and are returned when the Internet access environment setting program of the client 30 is terminated so that there is no change generated by basic usage by the client 30.

Figure 2A:
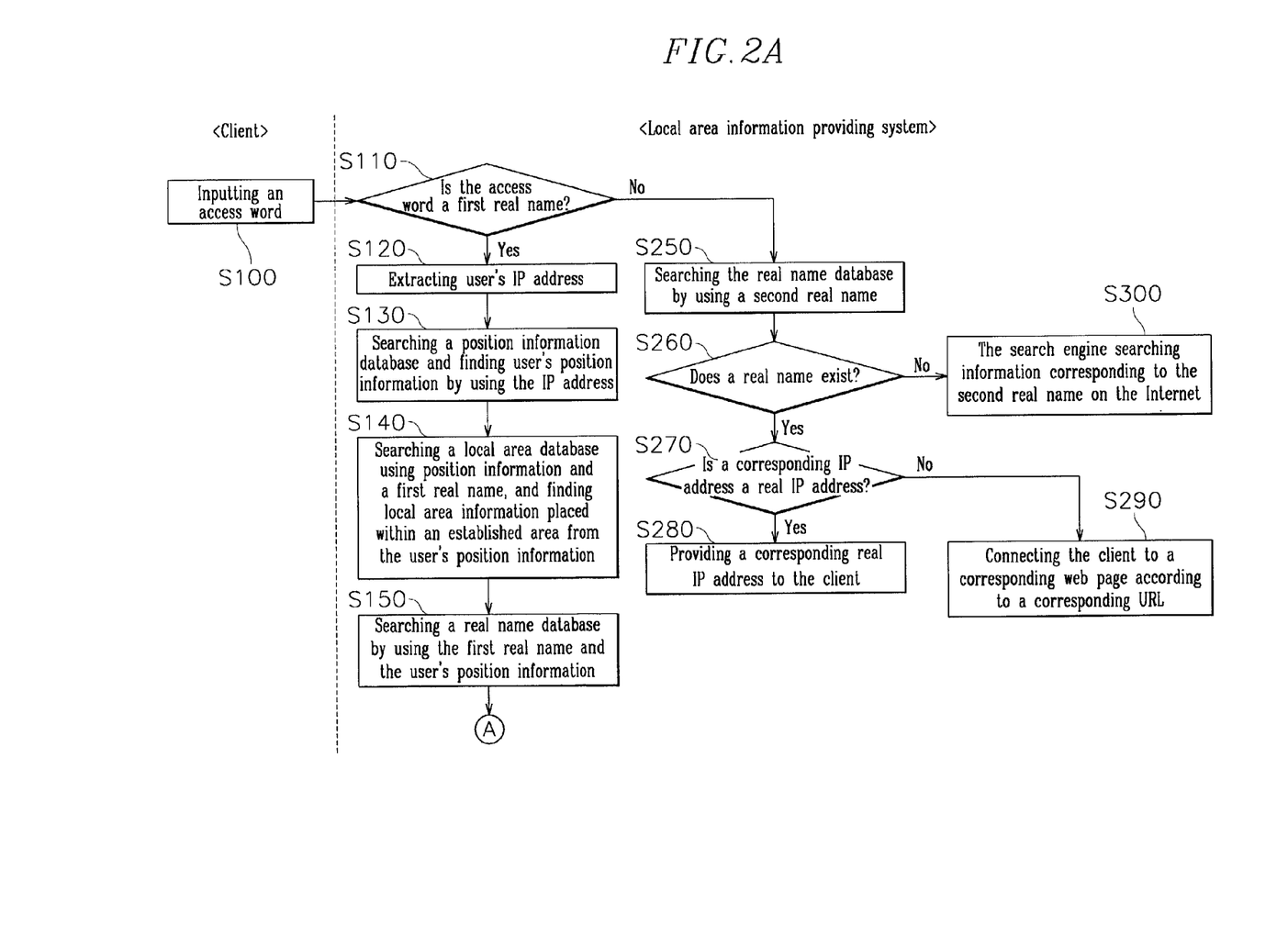
FIGS. 2(a) and 2(b) show a flow chart of the local area information providing system using a real name according to the first preferred embodiment of the present invention.
Figure 2B:
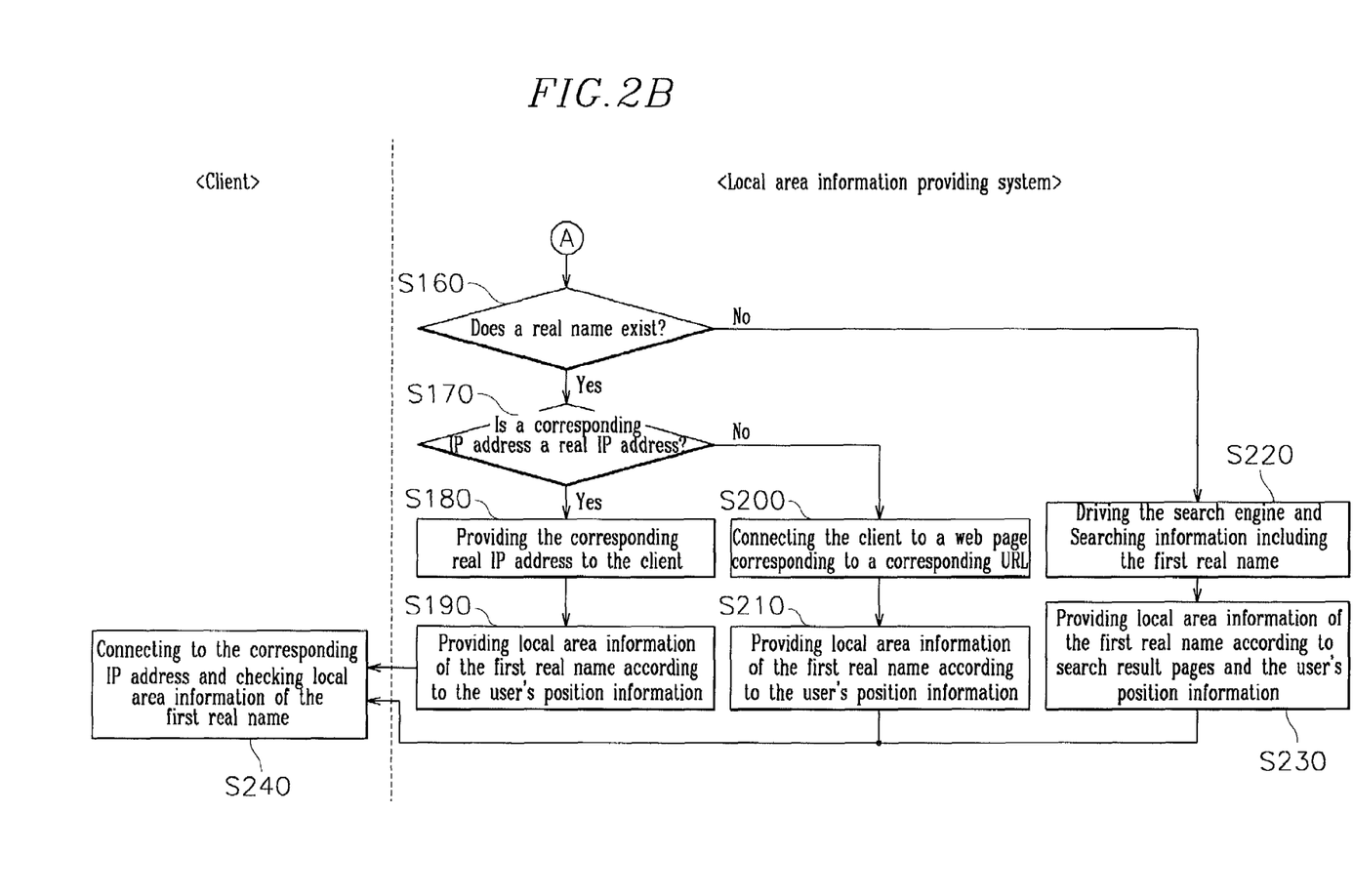

FIGS. 2(*a*) and 2(*b*) show a flow chart of the local area information providing system using a real name according to the first preferred embodiment of the present invention.

As shown in FIG. 2(*a*), when the user executes a web browser for accessing the Internet or an electronic mail program at the client 30 and inputs an access word in an access word input window of the web browser, the input access word is provided to the real name server 13 of the local area information providing system 10 according to the preferred embodiment in step S100.

The real name server 13 determines whether the access word provided by the client 30 is an English domain name or a real name, and when the access word is found to be a real name, determines whether the real name is a first real name or second real name in step S110. For example, when an input access word includes an identification character "." such as "netpia.net", the input access word is determined to be an English domain name, and the input access word is provided to the English domain server (not illustrated), and when the input access word does not include the identification character ".", the access word is determined to be a real name. When the input access word is a real name, it is determined whether the input real name is a first real name or a second real name in step S120. However, the real name determination method according to the present invention is not restricted to the above-noted description, and for example, the real names stored in the local area information database can be stored to be distinguished as the first real name having the local area information or the second real name not having the local area information.

When the access word provided by the client 30 is stored in the local area information database 112 and determined to be the first real name, the real name server 13 provides the first real name to the web server 12, and accordingly, the information extractor 122 of the web server 12 initially extracts the client's position information so as to provide the local area information.

The information extractor 122 extracts the IP address of the client 30, searches the position information database 113 using the extracted IP address, and finds the user's position information corresponding to the IP address in steps S120 and S130.

The information provider 123 searches the local area information database 112 using the user's position information and the first real name and finds the local area information of the first real name according to the user's position information in step S140.

For example, when the user's position information according to the IP address of the client 30 is searched as "Kangnam-ku Yoksam-dong" and the access word is the first real name of "municipality office", the local area information database 112 is searched to find information on a plurality of the municipality offices located at the area of "Kangnam-ku Yoksam-dong" corresponding to the first real name of the "municipality office."

As noted-above, the local area information according to the first real name input by the client 30 is found, and the real name server 13 searches the real name database 114 using the first real name and the user's position information and finds the corresponding IP address in step S150.

When the IP address is stored in the real name database 114 corresponding to the first real name and the user's position information, the real name server 13 determines whether the IP address corresponding to the corresponding real name is a real IP address in steps S160 and S170. When the IP address is a real IP address, that is, when another real name does not correspond to the IP address corresponding to the input first real name and the user's position information, the searched IP address is provided to the client 30, and the information provider 123 provides the local area information of the searched first real name using the user's position information in steps S180 and S190.

Hence, the client 30 accesses the corresponding web pages according to the IP address provided by the local area information providing system 10, and concurrently receives the local area information of the first real name provided by the local area information providing system 10.

For example, in the case of desiring to obtain information on theaters located at the Kangnam-ku Yoksam-dong, the client 30 is accessed to the web page corresponding to the "municipality office.Kangnam-ku Yoksam-dong", and concurrently receives information on a plurality of municipality offices located at the Kangnam-ku Yoksam-dong or on the areas established from the Kangnam-ku Yoksam-dong. Also, when a user positioned at the Kangnam-ku Yoksam-dong inputs a first real name "pizza", the user is accessed to the web page corresponding to the "Kangnam-ku Yoksam-dong" and concurrently receives information on the pizza delivery shops positioned at the Kangnam-ku Yoksam-dong.

When the IP address is not a real IP address in the previous step S170, that is, at least one different real name corresponds to the IP address corresponding to the input first real name and the user's position information, the connection processor 124 connects the client 30 to a corresponding web page according to the URL information corresponding to the first real name and the user's position information in step S200, and also in this case, the information provider 123 provides local area information on the searched first real name to the client 30 using the user's position information in step S210. Here, the client 30 may not be connected to the corresponding web page according to the IP address or URL corresponding to the first real name and the user's position information, but will receive local area information on the searched first real name based on the user's position information.

However, in the previous step S160, when the access word provided by the client 30 is not stored in the real name database 124, the search engine 125 is driven, collects information including the corresponding access word from a plurality of servers connected to the Internet 20 and connects the client 30 to an information search result page in step S220. In this case, the information provider 123 provides the local area information of the searched first real name to the client 30 using the user's position information in step S230.

Therefore, the client 30 accesses the corresponding web page using the real name, and concurrently receives local area information of the first real name according to the client's position information in step S240.

In the previous step S10 as shown in FIG. 2(*a*), when the access word input by the client 30 is not the first real name but the second real name, local area information on the real name according to the user's position information as described above is not provided, but the real name server 13 searches the real name database 114, finds the IP address corresponding to the second real name and provides the IP address to the client 30 in steps S250 through S280, and when the access word is not the real IP, the connection processor 124 of the web server 12 connects the client 30 to the corresponding web page according to the URL corresponding to the second real name in step S290, or when there is no IP address corresponding to the second real name, the search engine 125 searches information included in the access word via the Internet 20 and provides the information to the client 30 in step S300.

Hence, the client 30 can receive the web page accessing service and various kinds of information relating to the desired web pages without additional inputting of search words. Especially, the user receives information on the areas within a predetermined setting range at the user's position without additional assignment of positions.

Also, as local area information corresponding to the real names is provided according to the user's position information, the users respectively receive different local area information according to the users' position information even when inputting identical real names.

In the above preferred embodiment, the user's position information is extracted according to the IP address of the client 30, but differing from this, when the client 30 directly accesses a web page, the site manager 121 can search the user's postal address corresponding to the membership information database 111 by using the member ID provided by the client 30, and extract the user's position information based on the postal address.

Also, after an input window for inputting position information is provided to the client 30 instead of extracting the user's position information from the local area information providing system 10, the position information provided by the client via the input window can be used as a user's position information for providing local area information.

Figure 3:
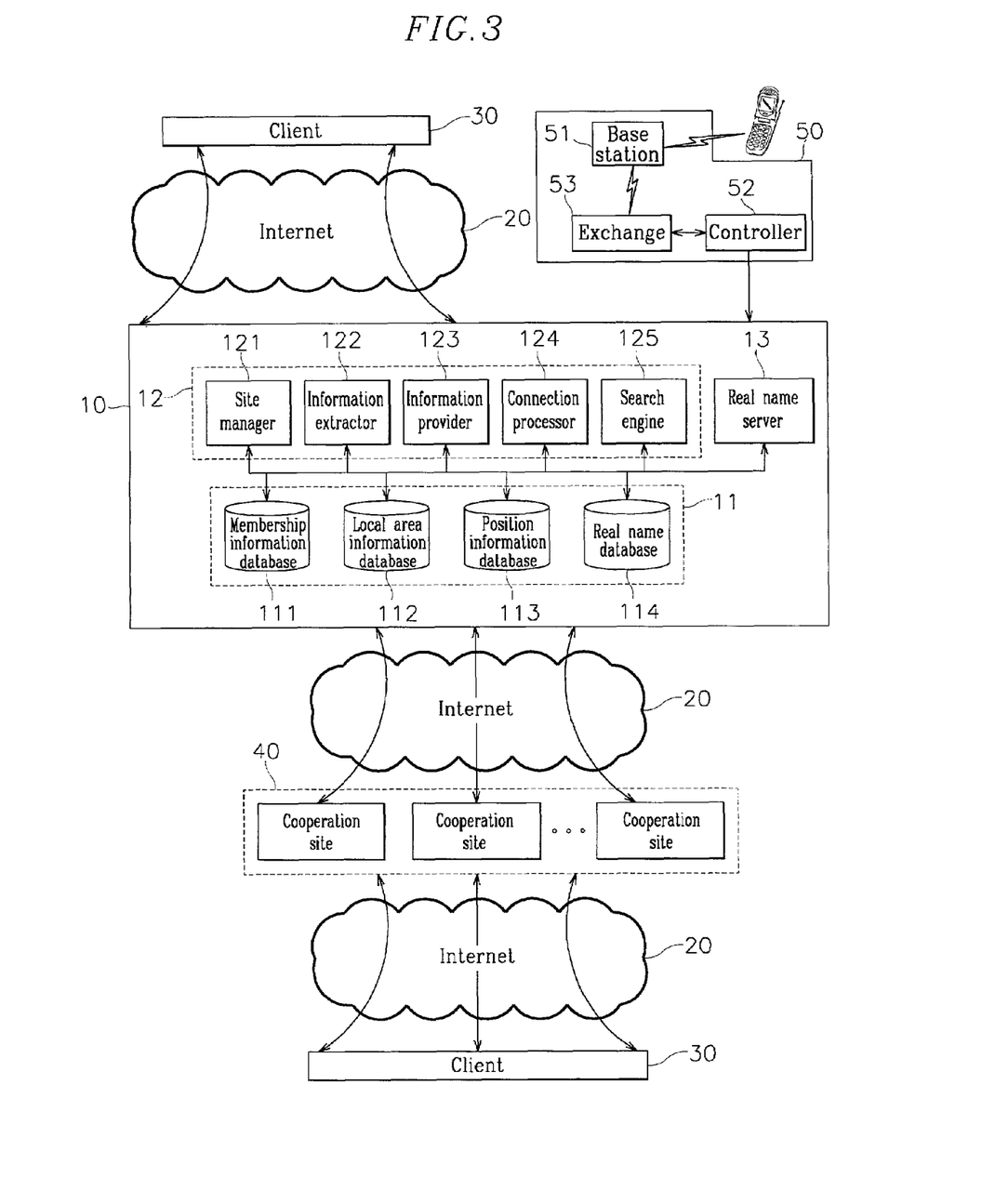
FIG. 3 shows a block diagram of a local area information providing system using a real name according to a second preferred embodiment of the present invention.

In addition, the user's position information can be obtained through a mobile communication system, and FIG. 3 shows a block diagram of a local area information providing system using a real name according to a second preferred embodiment of the present invention.

As shown, the configuration of the local area information providing system according to the second preferred embodiment of the present invention is identical with that of the first preferred embodiment of the present invention, and differing from the first preferred embodiment of the present invention, the second preferred embodiment is connected to a mobile communication system 50 for providing the user's position information.

In detail, the mobile communication system 50 comprises a base station 51 for receiving signals from a mobile communication terminal positioned within a corresponding cell, a controller 52 for detecting positions of the corresponding mobile communication terminal according to the signals output to the base station 51 and providing corresponding position information to the web server 12, and an exchange 53 for transmitting and receiving signals between the base station 51 and the controller 52. The operation description for transmitting and receiving the signals at the mobile communication system 50 with the mobile communication terminal will not be provided since the operation is prior art.

The operation of the local area information providing system using the real name according to the second preferred embodiment of the present invention is identical with that of the first preferred embodiment except the operation of the user's extracting the position information. Here, the client 30 includes a mobile communication terminal which can be connected to a wireless communication network.

When a user inputs an access word of the local area information providing system using the real name to the client 30, the access word is converted to a wireless markup language (WML) via a wireless application protocol (WAP) gateway, passed through the wireless communication network, and transmitted to the mobile communication service system 50, and the base station 51 provides a code assigned to the base station 51 and the access word to transmitted by the client 30 to the controller 52 via the exchange 53.

The controller 52 determines by what base station positioned at a predetermined area the information is provided according to the base station code provided by the base station 51, and provides position information of the base station according to determination results and the access word transmitted by the client 30 to the real name server 13 of the local area information providing system 10. Besides detecting the user's position information according to the code assigned to the base station, position information on the mobile communication terminal can be estimated using the time generated while the signals transmitted from the mobile communication terminal reach the base station.

The real name server 13 uses the position information provided by the mobile communication system 50 as the user's position information, and when the provided access word is the first real name, identical with the first preferred embodiment, the real name server 13 searches the real name database 114 using the position information and the first real name so as to find a corresponding IP address. The information provider 123 searches the local area information database 112 using the position information provided by the mobile communication system 50 so as to find corresponding local area information. Since subsequent operations are identical with that of the first preferred embodiment, no further detailed description will be provided.

Differing from this, when the client 30 is not a mobile communication terminal, the membership information database 111 is searched using the ID provided by the client 30 so as to find the user's mobile phone number, and the mobile phone number is provided to the mobile communication system 50 so as to request position information of the mobile communication terminal corresponding to the mobile phone number, and accordingly, position information of the mobile communication terminal provided to the mobile communication system 50 can be used as the user's position information.

As described above, the user's position information can be detected by a cell ID method through the wireless communication network such as PCS or by the global positioning system (GPS).

According to the second preferred embodiment, the user's position information can be more precisely detected to accurately provide local area information to the user.

Besides the above-noted preferred embodiments, when the client access a web page via a cooperation device, that is, when the access word is provided by inputting the access word via an input window provided by the site of the cooperation device, the client can access the web page corresponding to the access word, that is, the real name, and then receives local area information corresponding to the real name, identically with the first and second preferred embodiments.

Also, differing from the first and second preferred embodiments, when the client does not set the real name server with an IP address confirming the service providing server, for example, when the client directly accesses the local area information providing service system and inputs an access word into an access word window provided by the local area information providing system, and when an application program installed in the client checks an access word input operation and provides the input access word, the web page access service and local area information providing service are provided as described above.

The local area information providing system using the real name according to the preferred embodiments can be applied to electronic mail, file transfer protocol (FTP) and telnet as well as the world wide web (WWW).

Hence, according to the present invention, the user can access desired web pages using the real names besides the URLs of prior English domain names, and can receive various kinds of information related to desired web pages without an additional search word inputting process.

Further, since the user can receive various kinds of local area information corresponding to the desired web pages without additional assignment of predetermined positions, the user can receive profitable information more conveniently.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A local area information providing system, comprising:
a local area information database for storing local area information with respect to areas corresponding to first real names;
a first real name database for storing network addresses on a network, first real names and position information, wherein said first real names comprise a name in English and names of a verbal language other than English;
a second real name database for storing network addresses corresponding to second real names;
a web server for setting a position information of a client when an access word provided by the client is a first real name stored in the local area information database; and a real name server for determining whether the access word provided by the client is a first real name or a second real name when the access word is a real name, searching the first real name database using the first real name and position information of the client, finding a corresponding network address and providing the network address to the client when the access word input by the client is the first real name, and searching the second real name database using the second real name, finding a corresponding network address and providing the network address to the client when the access word input by the client is the second real name, wherein the real name server determines the access word as the first real name when the access word is stored in the local area information database and determines the access word as the second real name when the access word is not stored in the local area information database, wherein the real name server combines the position information of the client with the first real name and processes them as a single domain when the access word input from the client is the first real name.

2. The system of claim 1, wherein the first real name is a life information keyword.

3. The system of claim 1, wherein the system further comprises a position information database for storing position information corresponding to a network address on a network, and the web server searches the position information database and extracts position information by using the network address of the accessing client, and uses the position information as the position information of the client.

4. The system of claim 1, wherein the client provides position information to the web server via a program, and the web server uses position information provided by the client as the position information of the client.

5. The system of claim 1, wherein the system further comprises a membership information database for storing user information corresponding to an identification number assigned to the client, and the web server searches the membership information database and finds user information by using the identification number input from the accessing client, and extracts position information according to the user information, and uses the position information as the position information of the client.

6. The system of claim 5, wherein the user information comprises postal address, postal code and telephone number, and the web server extracts the position information of the client according to the postal address, postal code or telephone number.

7. The system of claim 1, wherein the client is a mobile communication terminal, and the web server is connected to a mobile communication service system, and the mobile communication service system detects position information of the mobile communication terminal and provides the position information to the web server, and the web server uses the mobile communication terminal's position information as the position information of the client.

8. The system of claim 1, wherein the client checks an access word input operation and provides the input access word to the web server.

9. The system of claim 1, wherein the web server provides an access word input window when the client accesses the web server via a network, and determines whether the access word is a real name when the access word is input from the client via the access word input window.

10. The system of claim 1, wherein the client provides the access word to the web server via a web browser.

11. The system of claim 1, wherein the client is a network accessible terminal.

12. The system of claim 1, wherein the local area information providing system is connected to a plurality of cooperation devices cooperating with local area information providing services via a network, and when the client accesses a cooperation device and inputs an access word to the cooperation device, the cooperation device provides the access word to the web server of the local area information providing system, and the web server provides corresponding local area information to the client according to the position information of the client when the access word provided by the cooperation device is a real name.

13. The system of claim 1, wherein the second real names comprise firm names, product names and service names.

14. In a method for providing local area information using a real name to a client that accesses via a network, a local area information providing method, comprising:
(a) determining whether an access word provided by a client that accesses via the network is a real name;
(b) when the access word is a real name, determining whether the real name is a first real name or a second real name, wherein said first real name can comprise a name in English or a name of a verbal language other than English;
(c) setting position information of the client when the access word is a first real name;
(d) providing a network address corresponding to the first real name and the position information of the client to the client, so that the client accesses a web page corresponding to the network address; and
(e) providing a network address corresponding to the second real name to the client when the access word is the second real name, so that the client accesses a web page corresponding to the network address, wherein the access word is determined as the first real name when the access word is stored in a local area information database and the access word is determined as the second real name when the access word is not stored in the local area information database, wherein the position information of the client is combined with the first real name, and the position information of the client and first real name are processed as a single domain when the access word provided by the client is the first real name.

15. The method of claim 14, wherein in the step (c), position information is extracted using a network address of the accessing client, and the position information is established as the position information of the client.

16. The method of claim 14, wherein in the step (c), position information is extracted using user information including a postal address, postal code and telephone number of the accessing client, and the position information is established as the position information of the client.

17. The method of claim 14, wherein in the step (b), position information provided by a program for inputting the position information of the client is set as the position information of the client.

18. The method of claim 14, further comprising providing uniform resource location (URL) information to the client when the access word is the first name and uniform resource location information corresponds to the first real name and the position information of the client.

19. The method of claim 14, further comprising providing a search result that represents local area information corresponding to the first real name and the position of the client when the access word is the first real name.

* * * * *